United States Patent [19]

Hardison et al.

[11] Patent Number: 5,362,389
[45] Date of Patent: Nov. 8, 1994

[54] FUEL FILTER ASSEMBLY WITH REVERSIBLE ELEMENT

[75] Inventors: Steven D. Hardison; Walter H. Stone, both of Modesto, Calif.

[73] Assignee: Parker Hannifin Corporation, Cleveland, Ohio

[21] Appl. No.: 888,688

[22] Filed: May 22, 1992

Related U.S. Application Data

[60] Continuation-in-part of Ser. No. 683,096, Apr. 10, 1991, Pat. No. 5,244,571, which is a continuation of Ser. No. 586,827, Sep. 24, 1990, abandoned, which is a division of Ser. No. 370,097, Jun. 20, 1989, Pat. No. 4,997,555, which is a continuation of Ser. No. 242,791, Sep. 9, 1988, abandoned, which is a continuation of Ser. No. 32,834, Mar. 30, 1987, abandoned, which is a continuation-in-part of Ser. No. 784,292, Oct. 7, 1985, Pat. No. 4,692,245, which is a continuation-in-part of Ser. No. 733,808, May 14, 1985, Pat. No. 4,668,393.

[51] Int. Cl.5 .............................................. B01D 27/08
[52] U.S. Cl. .................................... 210/232; 210/444
[58] Field of Search .................... 210/232, 248, 416.4, 210/444

[56] References Cited

U.S. PATENT DOCUMENTS

| | | | |
|---|---|---|---|
| 4,502,956 | 3/1985 | Wilson et al. | 210/248 |
| 4,668,393 | 5/1987 | Stone | 210/304 |
| 4,692,245 | 9/1987 | Church et al. | 210/232 |
| 4,997,555 | 3/1991 | Church et al. | 210/416.4 |
| 5,244,571 | 9/1993 | Church et al. | 210/232 |

*Primary Examiner*—Ivars Cintins
*Attorney, Agent, or Firm*—Ralph E. Jocke

[57] ABSTRACT

A fuel filter assembly (10) includes a filter head (12) having a fuel inlet (18) and a fuel outlet (20). A filter element (14) is attached to said filter head. A collection bowl (16) is attached to the filter element. The filter element includes an outer wall (36) with upper and lower turned in edge portions (62, 72). Upper and lower ring shaped members (64, 74) are in abutting contact with said turned in edge portions and are positioned intermediate of said edge portions and end caps (46, 48) of an annular filter medium (38). The end caps include central openings (54) surrounded by circular resilient gaskets (58). The filter element (14) is attachable by either of its ring shaped members to the filter head and collection bowl.

2 Claims, 4 Drawing Sheets

5,362,389

FUEL FILTER ASSEMBLY WITH REVERSIBLE ELEMENT

CROSS REFERENCE TO RELATED APPLICATIONS

This is a continuation-in-part application of application Ser. No. 7/683,096 filed Apr. 10, 1991 which is currently pending; which is a continuation application of application Ser. No. 07/586,827 filed Sep. 24, 1990, now abandoned; which is a divisional of application Ser. No. 07/370,097 filed on Jun. 20, 1989 now U.S. Pat. No. 4,997,555; which is a continuation of application Ser. No. 07/242,791 filed on Sep. 9, 1988, now abandoned; which is a continuation of application Ser. No. 07/032,834 filed on Mar. 30, 1987, now abandoned; which is a continuation-in-part of application Ser. No. 06/784,292 filed on Oct. 7, 1985 now U.S. Pat. No. 4,692,245; which is a continuation-in-part of application Ser. No. 06/733,808 filed on May 14, 1985 now U.S. Pat. No. 4,668,393.

TECHNICAL FIELD

This invention relates to filters for filtering hydrocarbon fuels used in motor vehicles. Specifically this invention relates to a fuel filter assembly that includes a reversible element with ends that may be mounted either to a filter head or to a collection bowl.

BACKGROUND ART

Various types of fuel filter elements are known in the prior art. A particularly popular fuel filter element configuration is the "spin on" type element which may be readily attached and detached from a filter head. An example of a spin-on type element is shown in U.S. Pat. No. 4,997,555 which is owned by the assignee of the present invention.

A popular type of spin-on element includes a see-through collection bowl which is releasibly attached to the lower end of the element. The collection bowl collects contaminants which are separated from the fuel by the action of the element. The see-through character of the collection bowl enables an operator to know that the bowl is filled with contaminants- An example of the spin-on filter element with an attachable bowl is shown in U.S. Pat. No. 4,668,393 which is also owned by the assignee of the present invention.

All of the prior art spin-on type filter elements of which Applicants are aware include a threaded "top" or "cover" plate at the top of the filter element. This top plate is typically made from heavy gage metal material. The central threaded opening in the top plate threads on to a spud which extends downward from the filter element mounting head. This threaded top plate enables the filter element to be sufficiently tightened to secure it to the head, as well as to compress a gasket that extends about the periphery of the element to provide a seal between the head and the element. This relatively thick, machined top plate adds substantial cost to the filter element.

All prior art filter elements of which Applicants are aware utilize a type of construction at the lower end of the element to attach the collection bowl, that is different from the construction used to attach the element to the head. As a result, the filter element may be installed only one way, that is with the top plate adjacent the head and the lower end of the filter element which includes the attaching mechanism for the bowl, away from the filter head.

Thus there exists the need for a fuel filter assembly that includes an element that does not have a costly top plate and which is fully reversible in that either end of the element may be satisfactorily attached to the head or the collection bowl.

DISCLOSURE OF INVENTION

It is an object of the present invention to provide a fuel filter assembly that includes an element that is more economical to manufacture.

It is a further object of the present invention to provide a fuel filter assembly which includes an element that is fully reversible and has ends that may be attached either to a filter head or a collection bowl of the assembly.

It is a further object of the present invention to provide a fuel filter assembly with a filter mounting head that is lower in cost and easier to produce.

Further objects of the present invention will be made apparent in the following Best Mode for Carrying Out Invention and the appended claims.

Foregoing objects are accomplished in the preferred embodiment of the invention by a fuel filter assembly including a filter head, a filter element releasibly attachable at the top of said element to said filter head, and a collection bowl releasible attachable to the bottom of said element. The element includes a generally cylindrical housing with an outer wall that includes upper and lower turned in edge portions. A first ring shaped member is supported on the lower turned in edge portion and is held between said lower turned in edge portion and a lower end cap that is attached to an annular filter medium.

A second ring shaped member is positioned between the upper turned in edge portion and an upper end cap attached to said filter medium.

The first and second ring shaped members include inwardly directed threaded portions. The filter head and collection bowl each include outwardly directed threaded portions for engaging either of said ring members. The filter head includes an annularly extending shoulder that is positioned so that the upper turned in edge portion of the filter element is positioned between said second ring shaped member and the shoulder of said head when said element is attached to the head.

The collection bowl also includes an outwardly threaded portion for engaging the threaded portion of either the first or second ring shaped members. The collection bowl also includes an annularly extending shoulder that is positioned so that the lower turned in edge of said element is positioned between the shoulder of the collection bowl and the first ring member when the collection bowl is attached to the element.

Each of the end caps bounding the filter medium include central openings centered with respect to the housing. Each of the central openings is bounded by a resilient gasket mounted to the end cap. The filter head includes an inner annular wall which extends downward and engages the gasket on the upper end cap when the filter element is mounted to the head. The chamber bounded by the inner annular wall is connected to the outlet of the filter head.

In operation, fuel from the inlet of the filter head passes to an outer chamber bounded by the outside of the inner annular wall. The fuel from the inlet moves downwardly into a peripheral chamber between the outer wall of the filter element and the filter medium. The fuel is filtered by passing through the filter medium from the peripheral chamber to a central area inside the medium. The area is opened through the central opening in the upper end cap to the inner chamber of the filter head. Filtered fuel passes from the central area of the medium, through the central opening in the end cap, through the inner chamber and out the outlet of the filter head.

The collection bowl also includes an inner annular wall which extends upward and bounds a blind chamber within the bowl. The inner annular wall of the bowl has a diameter similar to the inner annular wall of the filter head and engages the gasket bounding the central opening on the lower end cap of the filter medium when the bowl is engaged to the element. The inner annular wall of the collection bowl blocks fuel flow from an outer chamber of the bowl in which contaminants are collected. As a result, the central area of the filter medium is in fluid communication only with the outlet of the filter head.

The first and second ring shaped members of the filter element are identical so that either end of the filter element may be attached to the filter head or collection bowl. Further, the construction of the fuel filter assembly is suitable for use with filter elements that include either "outside in" or "inside out" flow through the element.

BEST MODE FOR CARRYING OUT INVENTION

Figure 1:
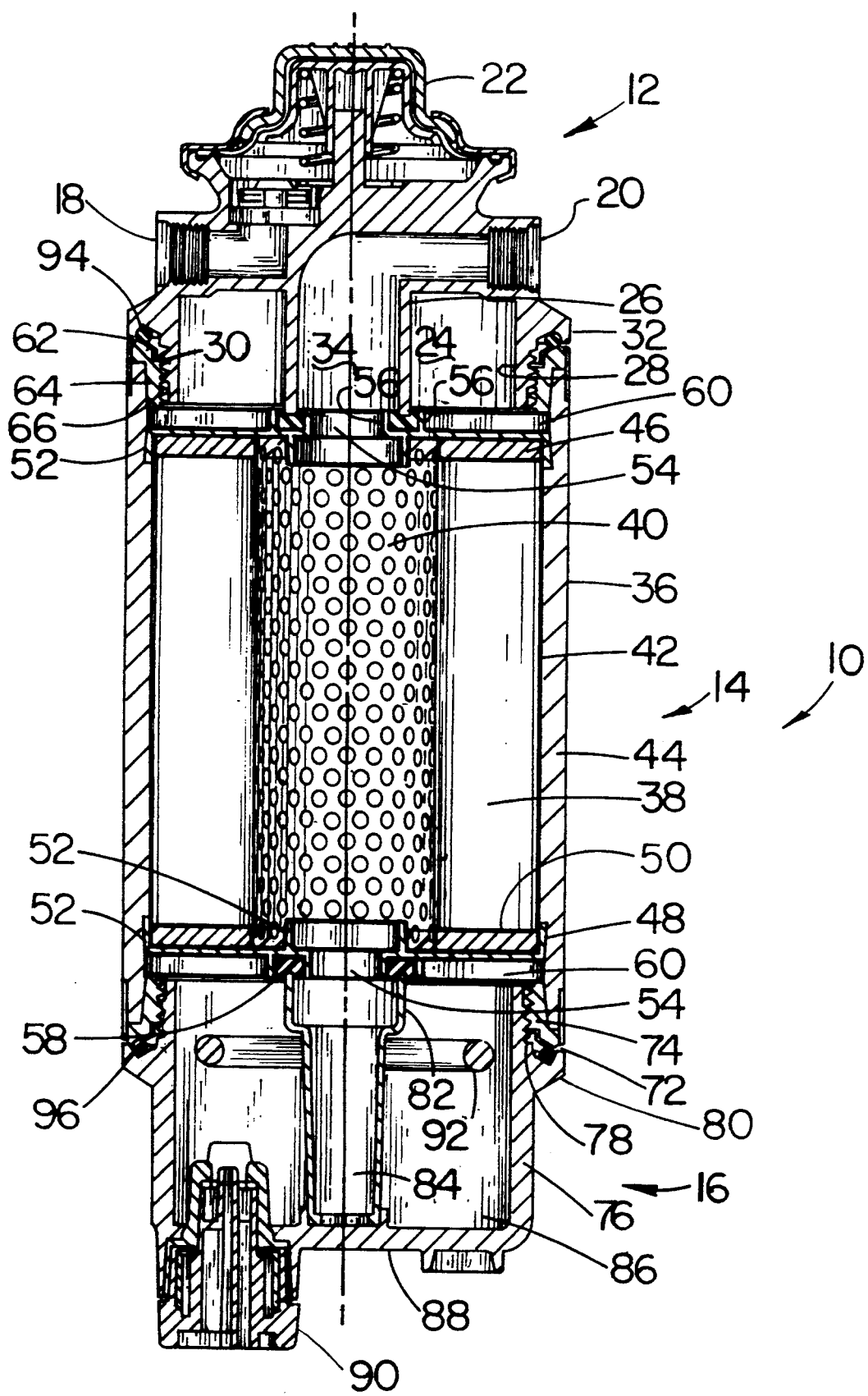
FIG. 1 is a cross sectional view of the fuel filter assembly of the present invention.

Referring now to the drawings and particularly to FIG. 1, there is shown therein the fuel filter assembly of the present invention, generally indicated 10. The fuel filter assembly includes a filter head, generally indicated 12, a filter element, generally indicated 14, and a contaminant collection bowl, generally indicated 16.

The filter head has an inlet 18 for accepting incoming fuel to be filtered, and an outlet 20 for delivering filtered to fuel to the remainder of the fuel system of the vehicle or other device on which the assembly is used.

The filter head incorporates a priming pump assembly, generally indicated 22 which is used for purposes of priming the filter head and element when the element is changed. The priming pump assembly 22 of the preferred embodiment is similar to that shown in U.S. patent application Ser. No. 07/849,264 which is owned by the assignee of the present invention and the disclosure of which is incorporated herein by reference.

Incoming fuel is delivered from the inlet 18 to an outer chamber 24 which is recessed upward in the filter head. Outer chamber 24 extends between a downward depending inner annular wall 26 and a downward extending outer annular wall 28. Outer annular wall 28 includes an outwardly threaded portion 30. A generally outward extending annular shoulder 32 extends radially from the filter head above outer annular wall 28.

An inner surface of inner annular wall 26 bounds an inner chamber 34 in the filter head. Inner chamber 34 is in fluid communication with outlet 20.

Filter element 14 includes a generally cylindrical housing which is bounded by an outer wall 36. Filter element 14 also houses an annular ring of filter medium 38. In the preferred form of the invention, the filter medium is of the pleated paper type, but in o other embodiments other types of filter media may be used. Filter medium 38 extends radially outward from a central perforated tube 40. Perforated tube 40 bounds a central area of the filter medium.

An outer surface 42 of filter medium 38 is inwardly disposed from an inner face of outer wall 36 of the filter housing. A peripheral chamber 44 is bounded by the outer surface of filter medium 42 and the inner face of wall 36.

Filter medium 38 is bounded in its upper end by an upper end cap 46, at its lower end by a lower end cap 48 which in the preferred embodiment are identical. The filter medium is held to the end caps by potting compound 50 in the conventional manner.

Each of the end caps have a generally circular central plate portion 51. Inwardly directed ribs 52 serve to hold the filter medium and perforated tube 40 in position. Ribs 52 are angled slightly in the axial direction to provide a funnel effect for ease of attachment to the filter medium. The end caps also include central openings 54 (see FIGS. 5-7).

Figure 5:
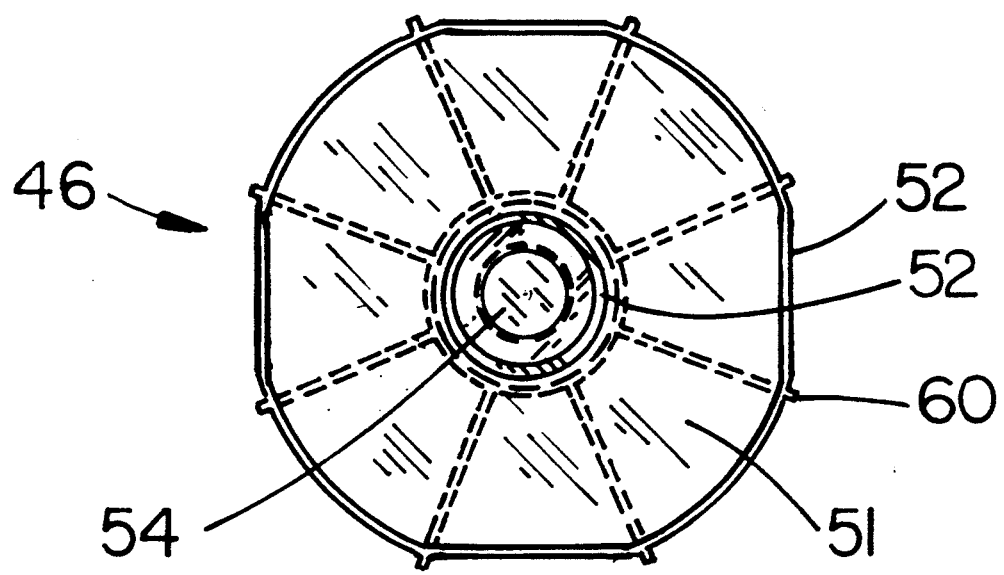
FIG. 5 is a top plan view of an end cap of the filter element.
Figure 6:
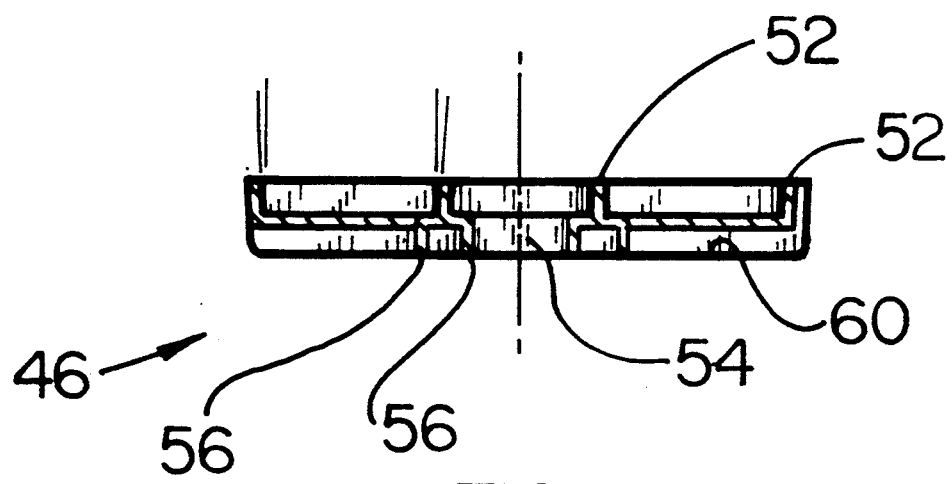
FIG. 6 is a cross sectional view of the end cap shown in FIG. 5.
Figure 7:
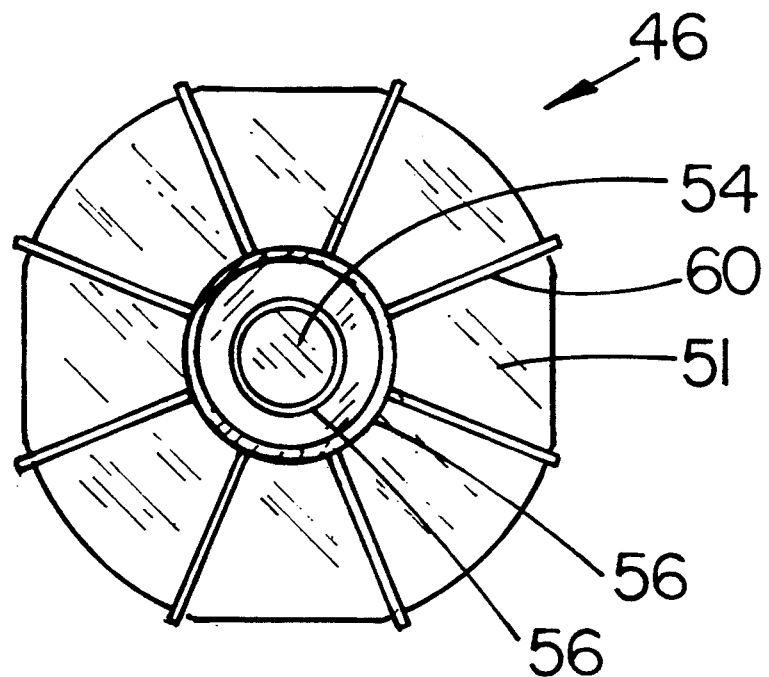
FIG. 7 is a bottom view of the end cap shown in FIG. 5.
Figure 1:
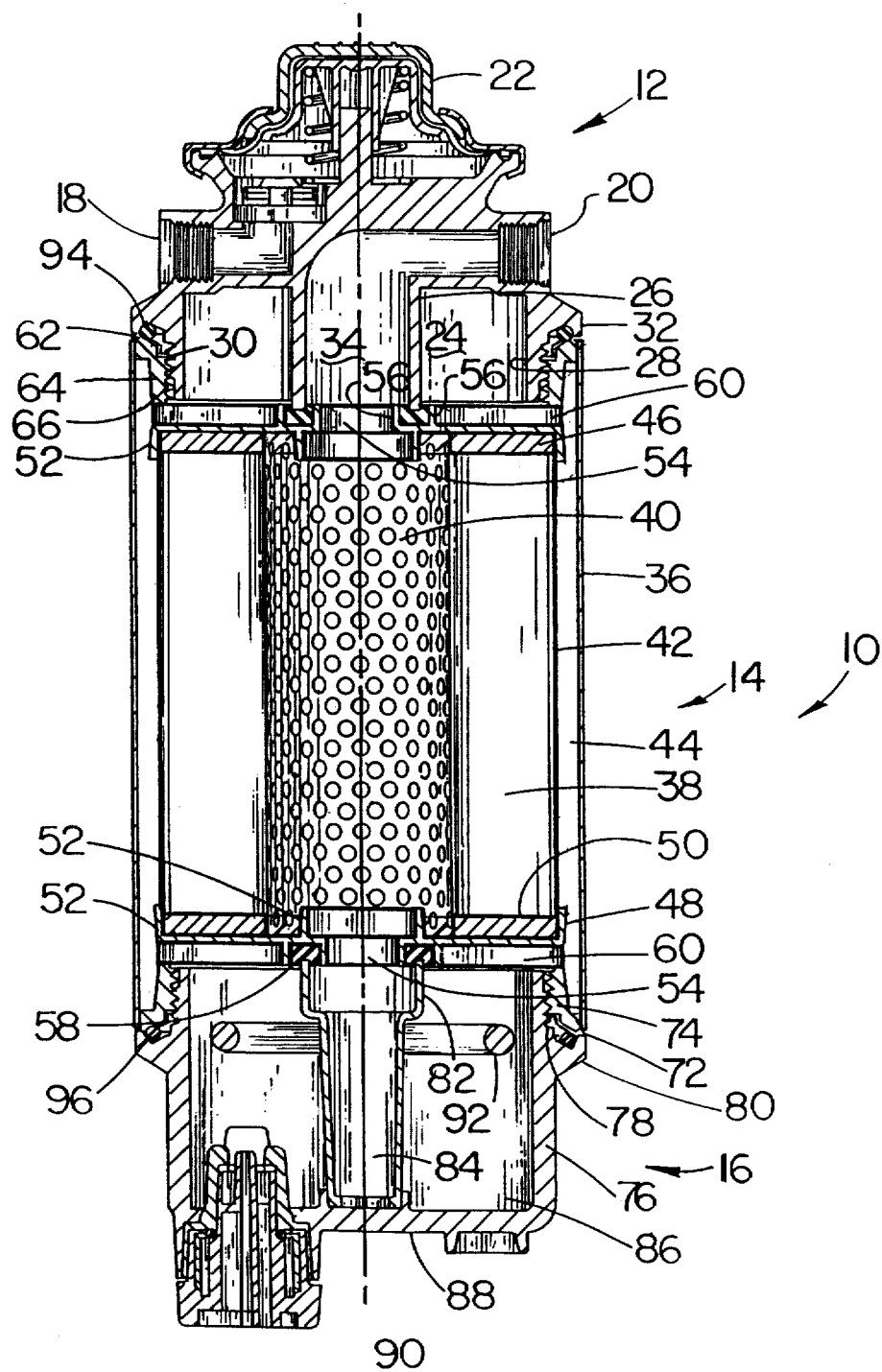

Central opening 54 in each end cap is bounded by a pair of spaced outwardly directed ribs 56. Outwardly directed ribs 56 bound a channel in which a resilient circular gasket 58 is positioned when the element is installed in the assembly. The end caps further include a plurality of radially extending ribs 60 that extend outwardly from the end cap and have similar height to ribs 56. Radially extending ribs 60 extend somewhat beyond the central plate portion 51 of the end cap as shown in FIGS. 5 and 7.

The outer wall 36 of filter element 14 includes an upper turned in edge portion 62. Turned in edge portion 62 extends circumferentially about the filter element. An upper ring shaped member 64 is positioned internally of said element and in abutting relation with the turned in edge portion. Upper ring shaped member 64 is also in abutting contact with the radially extending ribs 60 of upper end cap 46. Upper ring shaped member 64 has a threaded portion 66 which engages the threaded portion 30 of the filter head when the element is attached thereto.

Figure 2:
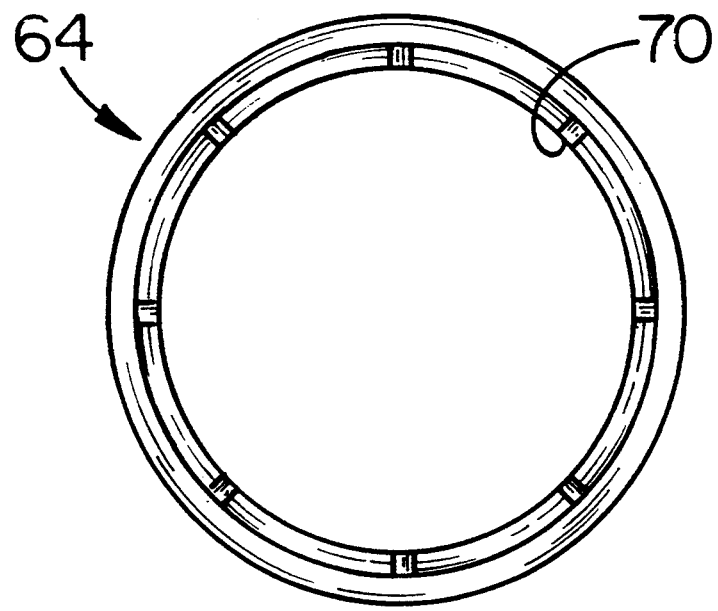
FIG. 2 is a plan view of a ring shaped member of the filter element.
Figure 3:
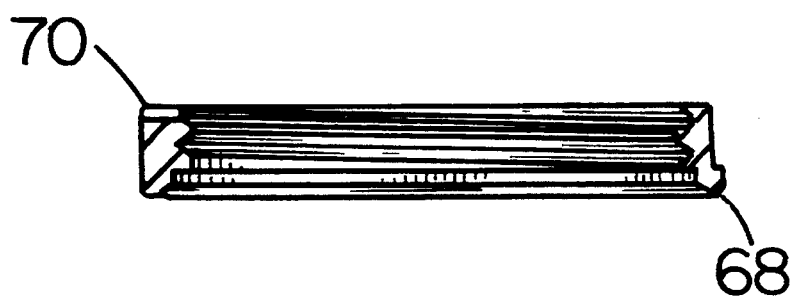
FIG. 3 is a cross sectional view of the ring shape member along line A—A in FIG. 2.
Figure 4:
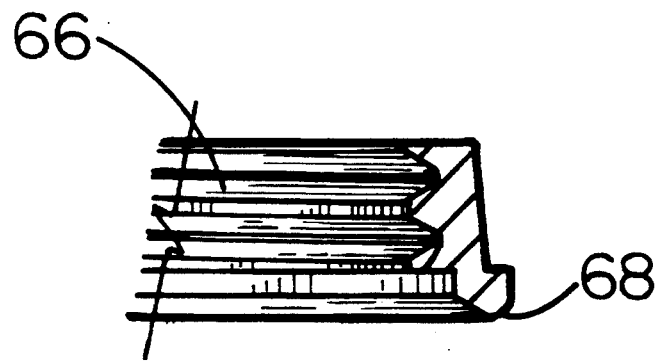
FIG. 4 is an enlarged cross sectional view of the section of the ring shaped member shown in FIG. 3.

Ring shaped member 64 shown in greater detail in FIGS. 2-4. Ring shaped member 64 includes a head portion 68 which is captured by upper in turned edge portion 62 of wall 36 of the filter element housing. Ring shaped member 64 also includes a plurality of slots 70 which are sized to accept radially extending ribs 60 of upper end cap 46.

Wall 36 of the filter element housing also includes a lower turned in edge portion 72 which in similar in configuration to upper turned in edge portion 62. Lower turned in edge portion 72 supports a lower ring shaped member 74 which is identical to upper ring shaped member 64, except that it is oppositely directed. Lower ring shaped member 74 supports the radially extending ribs 60 on lower end cap 48 of the filter medium.

Collection bowl 16 includes an outer annular wall 76. Outer annular wall 76 includes a threaded portion 78 that engages the threads on lower ring shaped member 74. Outer annular wall 76 further includes a radially extending shoulder 80. Shoulder 80 is positioned so that when collection bowl 16 is attached to filter element 14, lower turned in edge portion 72 is positioned between lower ring shaped member 74 and shoulder 80.

Collection bowl 16 further includes an upwardly directed inner annular wall 82. Inner annular wall 82 bounds a blind chamber 84. The upper portions of inner annular wall 82 are sized to engage gasket 58 on lower end cap 48 when the collection bowl is attached to the filter element. The engagement of inner annular wall 82 and the gasket on the end cap provides a fluid tight seal.

A contaminant collection chamber 86 is bounded by inner annular wall 82 and outer annular wall 76. As later explained, contaminants and water which are captured by the filter assembly, fall into the contaminant collection chamber 86. A lower wall 88 of the bowl 16 includes a conventional self venting drain valve 90 extending therethrough. Drain valve 90 enables the draining of water and other contaminants that collect in the bowl. The fuel filter assembly may also optionally include a fuel heater which is schematically represented by coil 92 positioned inside bowl 16.

The fuel filter assembly also includes an upper circular resilient gasket 94 which is positioned in a recess (not separately shown) in the head. Upper gasket 94 provides a fluid tight seal between the head 12 and the element 14. Likewise, a lower gasket 96 is positioned in a recess (not separately shown) in the shoulder 80 of the collection bowl. Lower gasket 96 provides a fluid tight seal between the collection bowl and the filter element.

In operation, fuel enters the inlet 18 of the filter head, and when the priming pump assembly 22 is not in use, flows directly into outer chamber 24. From outer chamber 24, fuel flows downwardly between the radially extending ribs of upper end cap 46 and into the peripheral chamber 44 between the wall of the filter housing and the outer surface 42 of the filter medium 38.

From the peripheral chamber 44, the fuel flows radially inward through the filter medium, passes through the perforated tube 40 and enters the central area inside the perforated tube. Because the opening 54 in lower end cap 48, is in sealed relation with blind chamber 84, no fuel can flow downwardly from the central area. Therefore, fuel in the central area flows upward into inner chamber 34 of the filter head, and out the outlet 20.

Contaminants such as water and other contaminants flowing into the peripheral chamber 44 collect on the filter medium and fall vertically downward. These contaminants fall to the level of fluid passageways that extend between radially extending ribs 60 of lower end cap 48. The contaminants then flow downward into the contaminant collection chamber 86 of collection bowl 16. In the preferred embodiment, collection bowl 16 is made of transparent material so that an operator can determine that contaminants have collected therein and may periodically open drain valve 90 to discharge said contaminants.

Because the construction of the upper and lower end caps and ring shaped members of the filler element are identical, either end of the filter element may be attached to the head or the collection bowl. As a result, a mechanic need not be concerned with which way the filter is installed. In addition, this construction avoids the need for a heavy metal top plate, as satisfactory engagement of head and filter element is achieved by the threaded portions of the head and upper ring shaped member 30 and 66, respectively. The gaskets 58 on the upper and lower end caps, provide superior sealing against inner annular wall 26 of the filter head, as well as against inner annular wall 82 of the collection bowl. As a result, there is no cross flow contamination through the fuel filter assembly.

Thus, the fuel filter assembly of the present invention achieves the above stated objectives, eliminate difficulties encountered in the use of prior devices and systems, solves problems and attains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown or described.

Having described the features, discoveries and principles of the invention, the manner in which it is constructed and operated and the advantages and useful results obtained; the new and useful structures, devices, elements, arrangements, parts, combinations, systems, equipment, operations and relationships are set forth in the appended claims.

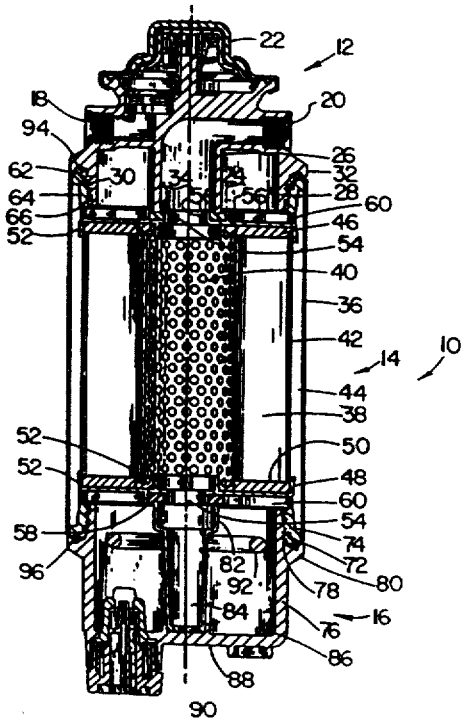

We claim:

1. A filter assembly comprising:
   filter head, a filter element and a collection bowl, said element comprising:
   cylindrical housing, said housing having an upper turned in edge portion extending circumferentially, said upper turned in edge portion adjacent an upper end of said housing, and a lower turned in edge portion extending circumferentially, said lower turned in edge portion adjacent a lower end of said housing;
   an upper ring shaped member, said upper ring shaped member disposed below and in abutting contact with said upper turned in edge portion of said housing, said upper ring shaped member including attaching means for selectively attaching said upper ring shaped member and said filter head, said head including a first peripheral wall having a first shoulder, said upper turned in edge portion of said housing extending between said upper ring shaped member and said shoulder of said head when said head and element are in an attached condition;
   a lower ring shaped member in abutting contact with said lower turned in edge portion interiorly of said housing, said lower ring shaped member including bowl attaching means for releasibly attaching said lower ring shaped member and said bowl, said bowl including a second peripheral wall having a second shoulder, said lower turned in edge portion of said housing extending between said lower ring shaped member and said second shoulder of said bowl when said element and bowl are in the attached condition.

2. The fuel filter assembly according to claim 1 wherein said attaching means on said upper and lower ring shaped members are interchangeably engageable with said bowl and said head, whereby said element is reversible.

* * * * *

UNITED STATES PATENT AND TRADEMARK OFFICE
CERTIFICATE OF CORRECTION

PATENT NO.   : 5,362,389
DATED        : Nov. 8, 1994
INVENTOR(S)  : Steven D. Hardison, et al It is certified that error appears in the above-identified patent and that said Letters Patent is hereby corrected as shown below:

The title page, showing the illustrative figure, should be deleted and substitute therefor the attached title page.

The drawing sheet, consisting of Fig. 1, should be deleted to be replaced with the attached page.

Signed and Sealed this

Sixth Day of January, 1998

*Attest:*

BRUCE LEHMAN

*Attesting Officer*   Commissioner of Patents and Trademarks

United States Patent [19]

Hardison et al.

[11] Patent Number: 5,362,389
[45] Date of Patent: Nov. 8, 1994

[54] FUEL FILTER ASSEMBLY WITH REVERSIBLE ELEMENT

[75] Inventors: Steven D. Hardison; Walter H. Stone, both of Modesto, Calif.

[73] Assignee: Parker Hannifin Corporation, Cleveland, Ohio

[21] Appl. No.: 888,688

[22] Filed: May 22, 1992

Related U.S. Application Data

[60] Continuation-in-part of Ser. No. 683,096, Apr. 10, 1991, Pat. No. 5,244,571, which is a continuation of Ser. No. 586,827, Sep. 24, 1990, abandoned, which is a division of Ser. No. 370,097, Jun. 20, 1989, Pat. No. 4,997,555, which is a continuation of Ser. No. 242,791, Sep. 9, 1988, abandoned, which is a continuation of Ser. No. 32,834, Mar. 30, 1987, abandoned, which is a continuation-in-part of Ser. No. 784,292, Oct. 7, 1985, Pat. No. 4,692,245, which is a continuation-in-part of Ser. No. 733,808, May 14, 1985, Pat. No. 4,668,393.

[51] Int. Cl.$^5$ ............................................. B01D 27/08
[52] U.S. Cl. ...................................... 210/232; 210/444
[58] Field of Search ...................... 210/232, 248, 416.4, 210/444

[56] References Cited

U.S. PATENT DOCUMENTS

| | | | |
|---|---|---|---|
| 4,502,956 | 3/1985 | Wilson et al. | 210/248 |
| 4,668,393 | 5/1987 | Stone | 210/304 |
| 4,692,245 | 9/1987 | Church et al. | 210/232 |
| 4,997,555 | 3/1991 | Church et al. | 210/416.4 |
| 5,244,571 | 9/1993 | Church et al. | 210/232 |

Primary Examiner—Ivars Cintins
Attorney, Agent, or Firm—Ralph E. Jocke

[57] ABSTRACT

A fuel filter assembly (10) includes a filter head (12) having a fuel inlet (18) and a fuel outlet (20). A filter element (14) is attached to said filter head. A collection bowl (16) is attached to the filter element. The filter element includes an outer wall (36) with upper and lower turned in edge portions (62, 72). Upper and lower ring shaped members (64, 74) are in abutting contact with said turned in edge portions and are positioned intermediate of said edge portions and end caps (46, 48) of an annular filter medium (38). The end caps include central openings (54) surrounded by circular resilient gaskets (58). The filter element (14) is attachable by either of its ring shaped members to the filter head and collection bowl.

2 Claims, 4 Drawing Sheets